United States Patent Office 3,332,647
Patented July 25, 1967

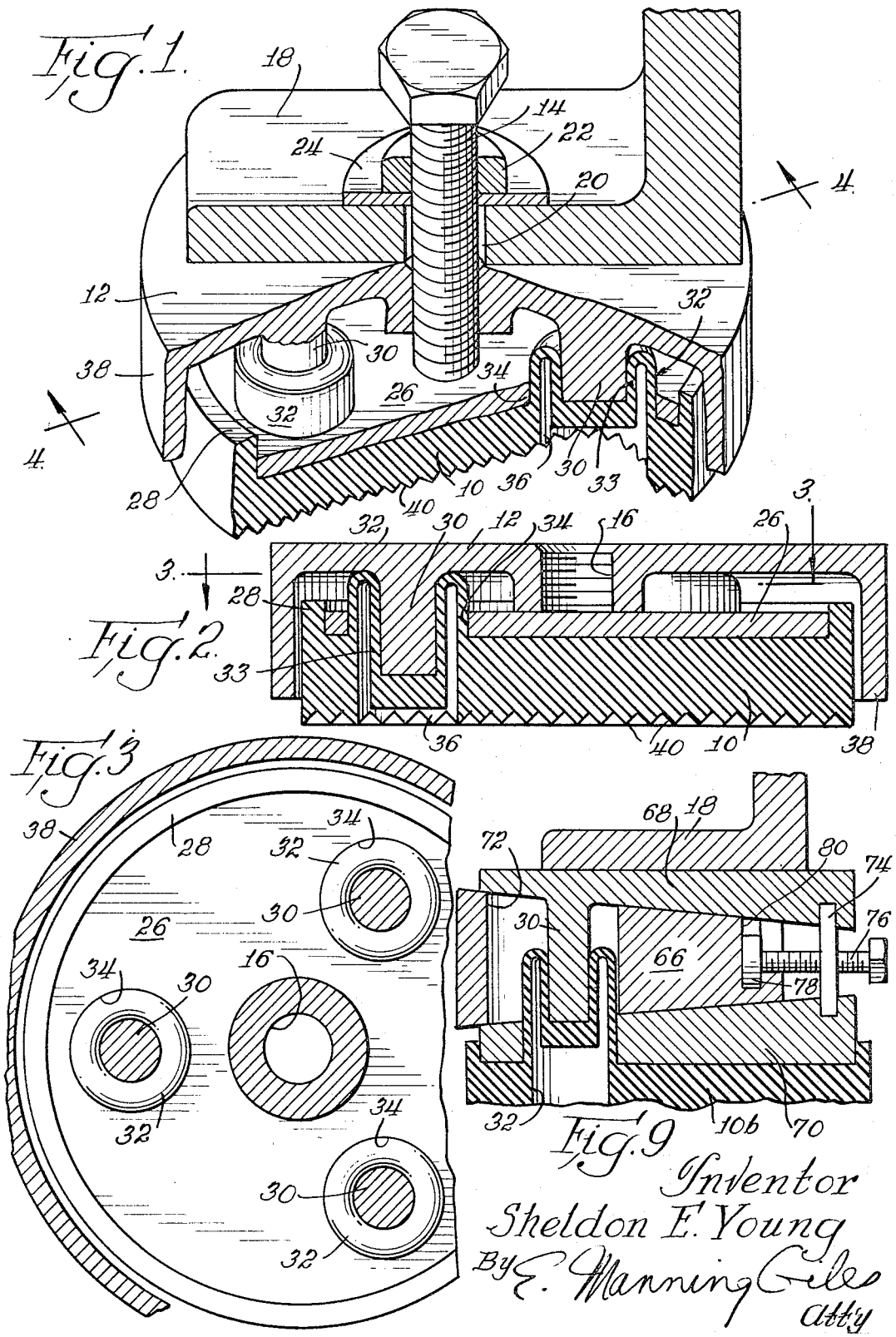

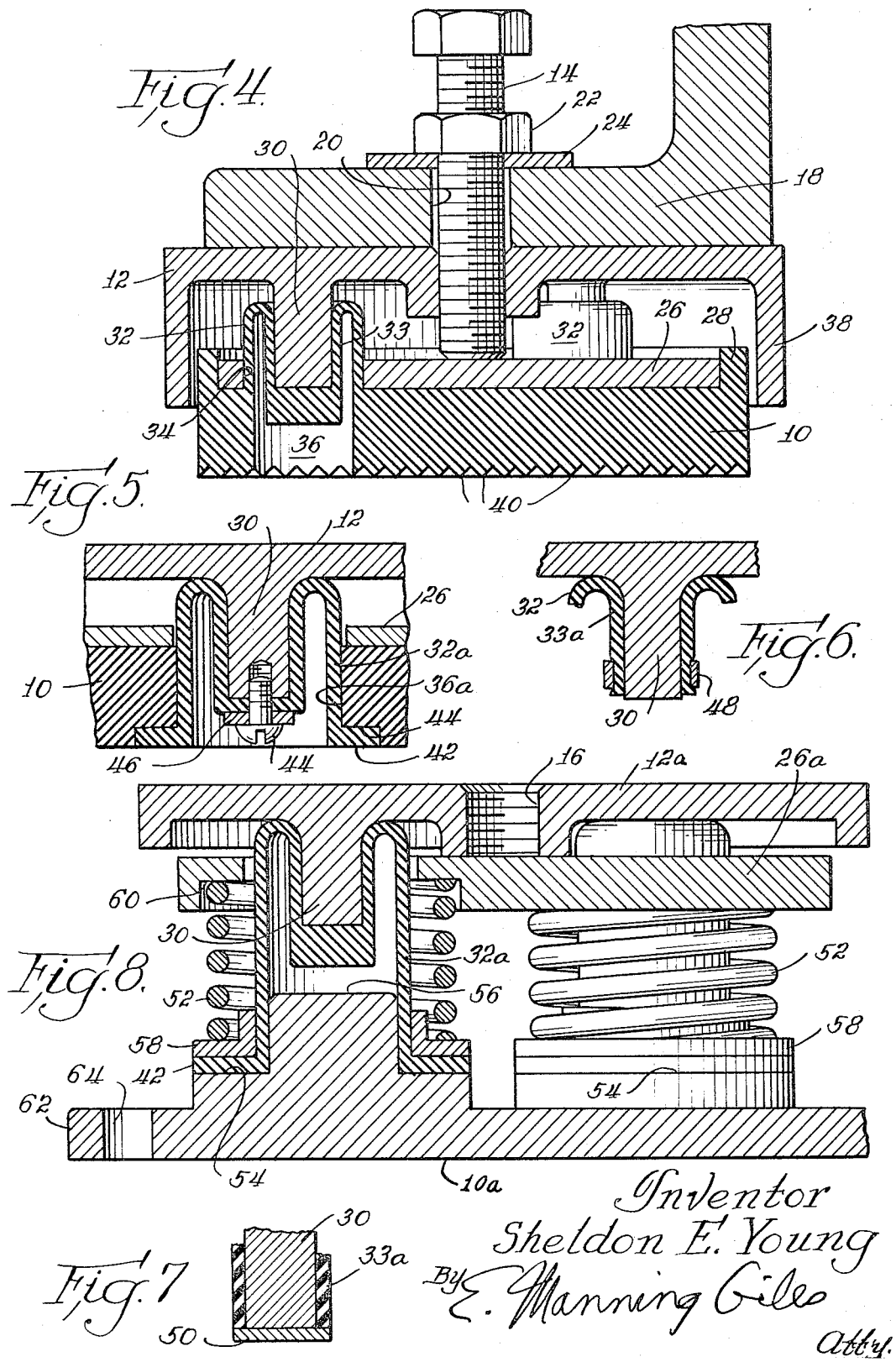

3,332,647
ADJUSTABLE VIBRATION ISOLATOR
Sheldon E. Young, 307 52nd Place,
Western Springs, Ill. 60558
Filed June 22, 1965, Ser. No. 465,949
7 Claims. (Cl. 248—24)

ABSTRACT OF THE DISCLOSURE

A vibration isolator which has a resilient base with a load-bearing disc on one side and an adjacent support plate. A bolt engaged through the plate bears on the disc and permits adjusting the space between the plate and the base. Separation of the plate from the base is resisted by yieldable tubular grippers which taper from the peripheries of recesses in the base toward the plate and engage corresponding projections on the plate. The projections and end portions of the grippers extend telescopically into the recesses in the base.

---

This invention relates to vibration isolators and more particularly to vibration isolators for supporting the legs of industrial machinery.

During operation, most industrial machinery either creates vibration or is adversely affected by it. The result often is excessive noise and wear and a loss of operating accuracy. In order to dampen and isolate such vibration in the case of machinery it is desirable to provide resilient vibration isolator or support members between the legs of machinery and the floor or base on which the machinery is mounted.

To permit accurate levelling of the machinery, even on irregular floors such as are found in some industrial plants, it is advantageous for the vibration isolators to be vertically adjustable.

Various kinds of resilient support devices have been developed for use as vibration dampeners for industrial machinery. Some are mere pads or cushions while others are both complex and costly. Some support devices have their parts bonded together, making the repair or replacement of a worn part difficult or impossible; other support devices tend to slide or shift position laterally as a result of continual operational vibration.

It is a principal object of the invention to provide a resilient vibration isolator which is adjustable in height, which serves to dampen and isolate vibration, and which overcomes many difficulties found in presently known devices.

It is another object of the invention to provide a vibration isolator which conforms to and grips the floor on which it is used and which resists both lateral and rotational displacement.

It is a further object of the invention to provide a vibration isolator which is easy to assemble and disassemble, which permits convenient replacement of damaged components, which is simple to install and use, and which is sufficiently versatile to accommodate a variety of industrial applications.

In accomplishing the foregoing and related objects, the invention provides a first body member with a plurality of fingers extending therefrom; a second body member including a plurality of flexible gripper members, there being one gripper member for each of the fingers; and a member for adjusting the spacing between the two body members.

For one embodiment of the invention the first body member is a cover plate with three downwardly extending finger-like projections disposed on an intermediate circumference with an angular separation of 120°; while the second body member comprises a disk of resilient and yieldable material. Corresponding with the three finger-like projections are three flexible, cup-like gripper members which extend into respective recesses of the disk member and are integral with it. The adjusting member is a threaded bolt which extends along the center line of the support device through the cover plate and into contact with a rigid member which rests on the surface of the disk.

For another embodiment of the invention the second body member is a steel plate with gripper members mounted on studs extending outwardly from the plate and proportioned to receive the fingers extending downwardly from a cover plate. In this embodiment an auxiliary coil spring surrounds a portion of each gripper member and is disposed between the first and second body members.

In a further embodiment of the invention the adjusting members takes the form of one or more adjustable generally wedge shaped members disposed between first and second body members at least one of which has an inclined face so that lateral movement of the wedge shaped member results in an adjustment of the spacing between the body members.

In use a vibration isolator device is inserted under each leg of a machine with the spacing members adjusted until the machine is level. Because of the way in which the gripper members are disposed with respect to the fingers the base or second body member is able to adopt a tilting position and thus conform with the uneven contours of floors sometimes found in manufacturing plants. In addition the engagement of the flexible grippers with the fingers of the cover plate permits motion with three degrees of freedom. Thus any motion produced by vibration in an up-and-down direction or in a side-to-side direction is absorbed by virtue of the flexible coupling between each gripper member and the base member.

Other aspects and features of the invention will become apparent after considering several illustrative embodiments, taken in conjunction with the drawings in which:

FIG. 1 is a perspective view of an adjustable vibration isolator in accordance with the invention, with portions removed to show details of construction;

FIG. 2 is a vertical section view along a diameter of the isolator of FIG. 1 showing the relationship of principal components;

FIG. 3 is a section view along the line 3—3 of FIG. 2;

FIG. 4 is a section view along the line 4—4 of FIG. 1;

FIG. 5 is a detail view of the finger and gripper elements of an isolator in accordance with the invention showing a modified form of attachment of a gripper to a finger;

FIG. 6 shows another modified form of attachment of a gripper to a finger;

FIG. 7 shows another modification of the attachment of FIG. 6;

FIG. 8 is a view of an isolator corresponding to that of FIG. 2 but showing an alternative form of resilient support; and FIG. 9 is a view of an isolator corresponding to that of FIG. 4 but showing an alternative form of spacing member.

Referring to FIG. 1, the vibration isolator shown there includes a first body member or cover plate 12 with a plurality of downwardly extending fingers 30, a second body or base member 10 with a plurality of grippers 32 and an adjusting member 14. The second body member is preferably a relatively thick circular disc formed of neoprene or other suitable resilient and compressible material. Neoprene is preferred because of its resistance to oil and other liquids which may be spilled on factory floors. The circular shape, however, is immaterial since rectangular or other shapes would function equally well.

In the embodiment of FIG. 1, a relatively rigid plate member, taking the form of a shell 12 of greater diameter than the base 10 but generally conforming therewith is mounted thereover and spaceable therefrom by means of a bolt 14 or other adjustable spacing means.

The bolt 14 is axially disposed with respect to the shell 12 and is engageable in threaded hole 16 at the center of the shell 12.

The shell 12 is attached to the foot portion 18 of a leg or support for an industrial machine (not shown). To enable such attachment, the foot 18 can be provided with a hole 20 of sufficient size to receive the bolt 14, the foot 18 being secured to the shell 12 by means of a lock nut 22 and a washer 24 as shown in FIGS. 1 and 4.

The base 10 has a circular bearing plate 26 seated on the top side thereof, the bearing plate 26 being of somewhat reduced diameter with respect to said base 10. The base 10 is provided with an upstanding peripheral rib 28 forming a recessed seat adapted to receive the bearing plate 26 and hold its circumferential edge against lateral displacement. The lower end of the bolt 14 is adapted to bear against the top surface of the bearing plate 26 and to communicate the load carried by said bolt 14 through the bearing plate 26 to the resilient base 10.

Taken together, the base 10 and the plate 26 form a second body or base member with a support-engaging face or surface and an opposed bearing face or surface with a resilient body portion in between.

The shell 12 is provided on its under side with a plurality of downwardly-depending fingers 30. The fingers 30 preferably project from and are integral with the shell 12 and spaced equidistant from its center. In FIG. 1 there are three such fingers 30 spaced 120° apart circumferentially.

The base 10 is provided with upstanding, flexible grippers 32 adapted to engage the respective fingers 30 and correspondingly spaced with respect thereto. In FIG. 1 the grippers 32 are molded of the same material as the base 10—preferably neoprene—and are integral therewith. The grippers 32 are relatively thin-walled so as to be flexible and in the disclosed embodiment are substantially circular in horizontal section with an outer cylindrical portion projecting upwardly from the base 10 and provided at the top with an inturned annular U-curved portion integrally connected with a telescoping inner cylindrical portion. The inner cylindrical portion is a finger-engaging socket 33 of slightly lesser diameter than the fingers 30 so as to fit same snugly and to resist separation when engaged therewith.

Where the grippers 32 are formed of neoprene, a desired degree of flexibility can be obtained with a material thickness in the vicinity of 1/16 inch. The invention is not limited, however, to the use of any specific material, and the range of thicknesses is limited only by whatever may be necessary with any selected material to provide the desired flexibility and resilience.

In the embodiment of FIG. 1 the grippers 32 are sufficiently flexible and elastic that the shell 12 can be raised or lowered through a range approaching the length of the fingers 30 without such fingers 30 becoming disengaged therefrom.

The bearing plate 26 is provided with circular openings 34 of substantially the same size as the outer circumference of the grippers 32 so as to permit the grippers 32 to protrude upwardly therethrough.

The base 10 is provided with a cylindrical opening 36 at the location of each gripper 32 and of substantially the same diameter as the gripper 32 so as to provide space within which the finger 30 and the corresponding finger-gripping socket 33 of the gripper 32 can be retracted as the shell 12 is raised and lowered with respect to the base 10. Thus, when the respective fingers 30 are engaged with the corresponding grippers 32, each finger 30 is engaged or gripped at its lower end by socket portion 33 and the latter flexes as the finger 30 is raised or lowered, thus adjusting automatically to the relative level of the finger 30 with respect to the cylindrical opening 36 in the base 10.

Desirably the shell 12 is provided with a peripheral downwardly curved skirt 38 which partially encloses and shields the edges of the base 10. Thus if a worker or moving equipment such as a fork-lift truck or a factory cart were to bump the assembly, the impact would be against the skirt 38 of the shell 12 and would not disturb or dislocate the resilient base 10.

As shown in FIG. 1 the bottom of the base 10 is molded with concentric serrations or corrugations 40 which, when pressed in sealing relation against a relatively flat floor, serve as a plurality of suction devices to resist sliding movement of the base 10 with respect to the floor.

The invention is readily adaptable to a variety of embodiments and modifications. For example, as shown in FIG. 5, the grippers 32a can be formed separately rather than as integral parts of the base 10 and can be inserted in the cylindrical openings 36a as shown. In this embodiment, the portion of each gripper 32a engaged in the cylindrical opening 36a is provided with a flange 42 and the base 10 is provided with corresponding annular seats 44 to receive the flanges 42.

An advantage of the construction of FIG. 5 is that a standard form of gripper 32a can be provided for use with vibration insolator bases 10 of varying diameters. Thus each size base 10 would be molded with cylindrical openings 36a of one standard size to receive the standard size gripper 32a.

Another modification shown in FIG. 5 is accomplished using the screw 44 which, in combination with a washer 46, may be used to secure the gripper 32a in engagement with the finger 30.

As shown in FIG. 6, the gripper 32 can be made with a tubular finger-engaging socket 33a without the closure or end-engaging seat disclosed in FIGS. 1, 2 and 4. In this form, the socket 33a can be secured to the finger 30 by means of a clamp 48 or with suitable adhesive applied circumferentially near the lower ends of and between the socket 33a and the finger 30.

As shown in FIG. 7, a circumferential cap 50 can provided at the lower end of a finger 30 against which the ends of the socket 33a are adapted to abut and to be held against displacement. If the cap 50 is permanenntly secured to the finger 30 such as by welding, the socket 33a must be sufficiently elastic to stretch during assembly so as to slip over the cap 50.

A still further modification of the vibration isolator device is shown in FIG. 8 wherein coil springs 52 are interposed between a modified form of bearing plate 26a and a base 10a. In this embodiment, the base 10a is preferably of metal and formed with annular seats 54 upon which the flanges 42 of the respective grippers 32a are adapted to be supported. A cylindrical stud 56 substantially equal to the inside diameter of the flanged end of the gripper 32a is engaged thereby. A spring-supporting annular collar 58 of metal or other rigid material rests on the flange 42 and serves as a seat for the bottom of the coil spring 52. The bearing plate 26a is provided on its underside with annular spring seats 60 which engage the tops of the coil springs 52.

The grippers 32a are sufficiently elongated in form, due to the interposition of the coil springs 52, to enable engagement with the depending fingers 30 on the underside of shell 12a which corresponds generally to the shell 12 shown in FIGS. 1, 2 and 4.

The base 10a may be formed with a circumferential flange 62 with spaced holes 64 through which the base can be secured by means of bolts (not shown) or the like to a factory floor.

FIG. 9 shows a modified form of vibration isolator in which height adjustment is obtained with wedge-like spacing means 66 interposed between upper and lower plates 68 and 70, respectively, with faces oppositely pitched with respect to said wedge means 66 and adapted to engage the respective pitched surfaces of said wedge 66. In this form, the upper plate 68 is provided with a plurality of downwardly depending fingers 30 adapted to be engaged by cooperating grippers 32 projecting upwardly from a modified base 10b.

The wedge 66 in this embodiment is provided with slot means 72 positioned to receive the fingers 30 and grippers 32 and is of sufficient length to permit lateral adjusting movement of the wedge 66 without interference with the functioning of said finger-gripper assembly.

In order to adjust the position of the wedge 66 relative to the plates 68 and 70, the latter are keyed correspondingly to receive a threaded disc or nut 74 which cooperates with a bolt 76 which has an enlargement 78 engaged in a suitable recess 80 in the wedge 66. Thus, by rotating the bolt 76 one way or the other, the wedge 66 can be moved to raise or lower the upper plate 68 with respect to the lower plate 70.

The wedge-type spacer shown in FIG. 9 is adapted principally for use with machines that are not equipped with mounting holes. It should be understood, however, that a stud or other attaching means could be provided on the plate 68 where required for mounting.

In use, a shell 12 and base 10 are first assembled in the manner shown in FIG. 2 without the bolt 14. The assembly is then placed under a machine base or foot 18 and a bolt 14 with a locknut 22 fully retracted is then inserted through a washer 24 placed on the base or foot 18 and through the hole 20 in said foot 18 and is engaged in the threaded opening 16 in the shell 12. The bolt 14 is rotated in the threaded opening 16 until it engages the bearing plate 26. Thereafter, the bolt 14 is rotated further to raise the shell 12 a desired distance above the base 10.

By installing similar vibration isolators on the other feet or bases of a machine, and adjusting the respective bolts 14, the machine can be leveled with extreme accuracy and floor irregularities can be compensated for. After each bolt 14 has been set at the desired position, the respective locknuts 22 are turned into clamping engagement against the washers 24 so as to hold the bolts 14 firmly against displacement or rotation.

Various changes can be made in the disclosed embodiments without departing from the spirit of this invention, the scope of which is to be determined by the following claims.

I claim:
1. An adjustable vibration isolator having a first body, a second body spaced therefrom, said second body comprising a resilient element, and adjustable means for spacing one of said bodies from the other wherein the improvement comprises the combination of
    a plurality of projections depending from one of said bodies toward the other body,
    grippers having means for engaging the projections, said grippers having yieldable lateral extensions secured to the other body,
    recesses in the other body of greater lateral dimension than said grippers,
    said grippers being substantially coaxial with said recesses so as to be telescopically receivable therein, whereby vertical and lateral movement of the grippers and projections is permitted.

2. An isolator as defined in claim 1 wherein the yieldable extensions flare outwardly from said grippers toward the other body adjacent the recesses therein.

3. An isolator as defined in claim 1 wherein the adjustable spacing means comprises a support member engaged in selectively positionable relation through one of said bodies and adapted to bear against the other body.

4. An isolator as defined in claim 3 wherein the spacing means is engaged with the first body and the second body is provided with a bearing member against which said spacing means is adapted to bear.

5. An isolator as defined in claim 2 wherein the second body is provided with a bearing plate juxtaposed toward the first body and the first body is provided with adjustable spacing means adapted to engage said bearing plate.

6. An isolator as defined in claim 5 wherein the recesses are in the second body and the bearing plate is provided with openings corresponding with said recesses and through which openings said yieldable extensions pass.

7. An isolator as defined in claim 1 wherein the yieldable extensions are integral with said resilient element and surround the recesses therein, said extensions tapering dimensionally from said resilient element to the gripper portions thereof.

References Cited

UNITED STATES PATENTS

| | | | |
|---|---|---|---|
| 2,538,955 | 1/1951 | Efromson et al. | 248—358 |
| 2,697,578 | 12/1954 | Whittam | 248—358 |
| 2,739,774 | 3/1956 | Crede | 248—24 |
| 2,779,559 | 1/1957 | Bertuch | 248—24 |
| 2,936,139 | 5/1960 | Lindstrom | 248—24 |
| 3,011,776 | 12/1961 | Reed | 248—22 X |
| 3,198,324 | 8/1965 | Kallenbach et al. | 248—20 X |
| 3,235,244 | 2/1966 | Hein | 248—22 X |

FOREIGN PATENTS 1,044,891  6/1953  France.

ROY D. FRAZIER, *Primary Examiner.*

CLAUDE A. LE ROY, *Examiner.*

R. P. SEITTER, *Assistant Examiner.*